June 30, 1925.
A. C. SLOAN
MOLDING DEVICE
Filed June 24, 1920
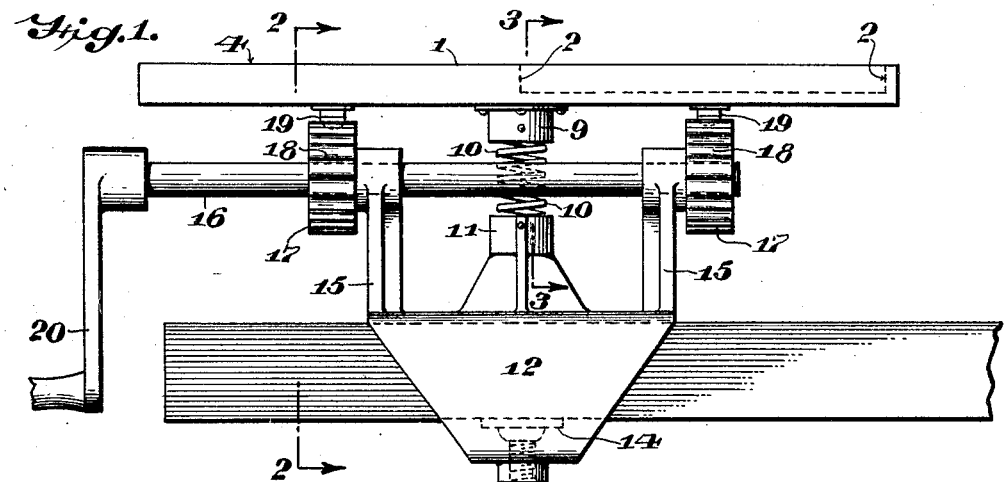
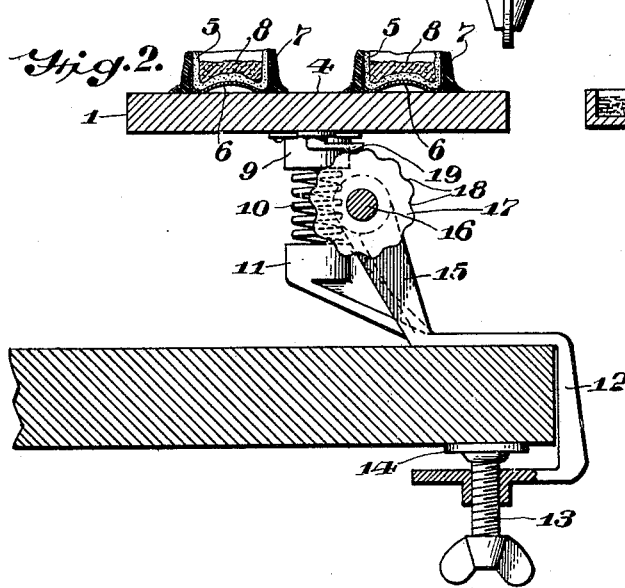
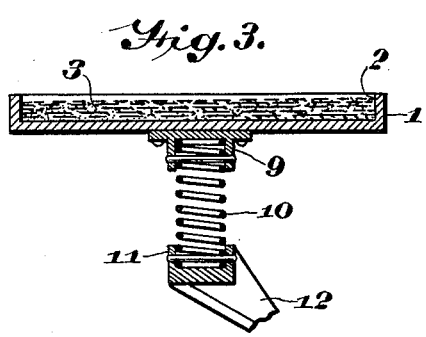
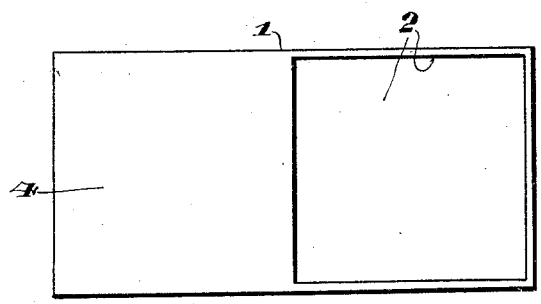
INVENTOR.
Alfred C Sloan Patented June 30, 1925.

1,543,955

UNITED STATES PATENT OFFICE.

ALFRED C. SLOAN, OF PHILADELPHIA, PENNSYLVANIA.

MOLDING DEVICE.

Application filed June 24, 1920. Serial No. 391,414.

*To all whom it may concern:*

Be it known that I, ALFRED C. SLOAN, a citizen of the United States, residing at Philadelphia, in the county of Philadelphia and State of Pennsylvania, have invented certain new and useful Improvements in Molding Devices, of which the following is a specification.

My invention relates to a novel molding device, primarily adapted for use by dentists to produce in plaster or any other suitable plastic material the positive mold from a wax impression or negative mold taken from the subject's mouth, the device comprising mainly a platform or molding-board adapted to be vibrated or reciprocated, and which consists of a combined container and support for the plastic molding material and the wax impression-mold or molds into which said plastic material is adapted to be formed to produce the positive mold.

Furthermore, my invention resides in providing a vibratory member or molding-board of this character yieldingly carried by a support, the molding-board on its upper surface being provided with combined means for containing the plastic molding material and forming a supporting face for the wax impression-molds, the under surface of the board being provided with means to co-operate with means carried by the support to vibrate said molding, the device being operated either manually or by power.

A still further object of my invention is to provide a molding device of this character which comprises a molding-board provided with a resilient support, and means in operative connection with said molding-board to reciprocate the molding-board, said means to be operated either manually or by power.

With these and other objects in view, my invention comprises additional novel details of construction and operation clearly brought out in the following description, when read in conjunction with the accompanying drawings, in which—

Fig. 1 represents a front elevational view showing an embodiment of my invention;

Fig. 2 represents a vertical sectional view taken on the line 2—2 of Fig. 1, illustrating several of the dental molding devices or impression-molds secured to the vibratory molding-board;

Fig. 3 represents a fragmentary vertical sectional view taken on the line 3—3 of Fig. 1, showing the tray for containing the molding compound; and Fig. 4 represents a top plan view of the molding-board.

Referring to the drawings, and more especially to Figs. 1 and 2, I have shown my device secured to the edge of a table by a clamping means, it being readily understood that the device may be mounted or supported in any suitable manner.

Heretofore the method of casting the positive mold of a mouth from the wax impression or negative mold has been carried out by hand operation, which entailed considerable labor upon the part of the operator in jarring the impression-mold to set the plastic material of the positive mold therein, and which operation has been found to be most inefficient in that the movement of the hand in jarring causes an irregular distribution and varying density in the body of the plastic material for the positive mold.

To overcome the above described inefficiency of hand operation, I have provided a novel device mechanically operated to impart constant and regular vibrations to the impression-mold, thereby effecting a very efficient method of molding the positive mold from the impression-mold.

In carrying out the principle of my invention, I have shown an embodiment thereof in the drawings in which 1 designates a platform or molding-board, a portion of the upper face of which is cut out to provide a tray 2 for containing the plastic material 3 from which the positive mold is formed, while the remaining upper portion of the board forms a supporting surface 4 for the wax impression-molds 5 contained in the mouth trays 6, said trays being held to the supporting surface 4 by the wax 7, which wax completely encircles the outer walls of the tray 6 and the impression-mold 5, and closes the open end of the impression-mold to confine the plastic material in the impression-mold when forming the positive mold 8.

To the underface of the molding-board is secured a socket 9, in which is securely fastened the upper portion of a resilient coil-spring 10, while the lower end of said spring is secured in a socket 11 integral with a support or clamp 12 provided with a threaded opening, in which engages the threaded bolt 13 formed with a head 14 to frictionally engage the underface of the table, and to rigidly hold the clamp to the latter. It will readily be seen that with this construction, the molding-board is yieldingly carried by the supporting clamp 12.

15—15 designates vertically extending arms integral with the clamp 12, the upper portion of these arms forming journal-bearings for the shaft 16, provided on one end thereof with a crank 20 for revolving the shaft. 17—17 designates discs secured to the shaft 16, the peripheral faces of these discs being mutilated as at 18, to engage the fingers 19 secured to the underface of the board, to impart vibrations to the board when the discs are revolved.

In the operation of my molding device, the operator securely fastens the mouth-tray containing the impression-mold of wax on the surface 4 of the molding-board 1 through the medium of the wax 7, or any other suitable means, the wax serving to close the open end of the impression-mold. The plastic material is then placed in the tray portion of the molding-board. The operator then manipulates the crank 20 to revolve the shaft 16, thus revolving the mutilated discs 17 which are in engagement with the fingers secured to the underface of the molding-board imparting vibrations to said molding-board due to the manner in which the molding-board is yieldingly supported from the stationary element or clamp 12. Due to the vibration of the molding-board, the plastic material supported and contained thereon is agitated to bring it to a proper consistency, with all the air removed from the compound, and while this operation still continues the operator with a scalpel applies said plastic material to the wax negative or impression-mold 5 to form the positive mold 8. It will readily be seen that with the continuous and simultaneous agitation of the plastic material while in the loose form and when deposited in the impression-mold, an even consistency of the material is effected at all times during the molding operation, which is very essential in producing the positive mold or negative mold carried in the mouth-tray 6.

After the plaster of the positive mold 8 solidifies to a proper hardness or density, the wax of the negative mold 5 is separated therefrom, leaving the positive mold of the subject's mouth. The production of the positive mold of the mouth is one of the several steps necessary in the making of the vulcanite denture. It will of course be understood that with a slight variation in the mode of procedure, the positive mold produced by my method may readily be utilized to produce a metallic denture.

Having thus described my invention, what I claim and desire to protect by Letters Patent of the United States is:—

1. The method of making a dental mold, which consists in taking an impression in a plastic substance to form a negative mold, vibrating the mold, and placing a second substance in said mold while vibrating.

2. The method of making a dental mold, which consists in taking an impression in a plastic substance to form a negative mold, slowly introducing a second substance in said mold, and while introducing said substance imparting uniform vibratory movement to said mold.

3. The method of molding plastic material, which consists in introducing the material into a mold in small quantities and simultaneously imparting vibratory movement to said mold to effect uniform distribution of said material in said mold.

4. A vibratory molding-device for dental use, which comprises in combination a molding-board and a support therefor, said molding-board being formed with a containing tray adapted to contain plastic molding material and a supporting face upon which is adapted to be held dental molding devices, said molding-board being yieldingly carried by said support, and means carried by said support co-operating with means carried by said molding-board to vibrate the latter.

5. A vibratory molding device for dental use, which comprises in combination a molding-board and a support therefor, said molding-board being formed with a containing tray adapted to contain plastic molding material and a supporting face upon which is adapted to be held dental molding devices, said molding-board being yieldingly carried by said support, means carried by said support co-operating with means carried by said molding-board to vibrate the latter, and means for rigidly securing said support to a stationary element.

6. A vibratory molding device for dental use, which comprises in combination a molding-board and a support therefor; said molding-board on its upper face being provided with a combined container and mold supporting face, a spring, one end of said spring being secured to the underface of said molding-board, while the other end of said spring is secured to said support, depending fingers secured to the underface of said molding-board, a rotatable shaft journalled in said support, discs secured to said shaft, said discs being provided with serrated peripheral faces, said depending fingers in engagement with the peripheral faces of said discs, and means for rotating said shaft.

7. A vibratory molding device for dental use, which comprises in combination a molding-board and a support therefor, said molding-board on its upper face being provided with a combined container and mold supporting face, a spring, one end of said spring being secured to the underface of said molding-board, while the other end of said spring is secured to said support, depending fingers secured to the underface of said molding-board, a rotatable shaft journalled in said support, discs secured to said shaft, said discs being provided with serrated peripheral faces, said depending fingers in engagement with the peripheral faces of said discs, and means for manually rotating said shaft.

8. A vibratory molding device for dental use, which comprises in combination a molding-board and a support therefor, said molding-board on its upper face being provided with a combined container and mold supporting face, a spring, one end of said spring being secured to the underface of said molding-board, while the other end of said spring is secured to said support, depending fingers secured to the underface of said molding-board, a rotatable shaft journalled in said support, discs secured to said shaft, said discs being provided with serrated peripheral faces, said depending fingers in engagement with the peripheral faces of said discs, means for manually rotating said shaft, said support comprising a clamp, and means for rigidly holding said clamp to a stationary element.

9. Molding apparatus, comprising a mold, a yielding support for said mold, and means for vibrating said mold while yieldingly supported.

10. Molding apparatus, comprising a mold, a spring for supporting said mold for universal movement, and a rapping device for vibrating said mold.

11. Molding apparatus, comprising a mold table, a helical spring for supporting said table, a pair of toothed members mounted for engagement with said table, and means for rotating said members.

12. Molding apparatus, comprising a mold table, a helical spring disposed beneath said table and serving as a support therefor, a plurality of toothed members engaging the underside of said table in spaced relation to one another and to said spring, and means for rotating said members.

In testimony whereof, I have affixed my signature.

ALFRED C. SLOAN.

Witnesses:
A. ALBERT BULMER,
THEODORE ROSEMANN.